United States Patent
Weeks et al.

(10) Patent No.: US 10,982,979 B2
(45) Date of Patent: Apr. 20, 2021

(54) LABEL SENSING MECHANISM WITH TWO OPTICAL SENSORS AND DIFFERENT SENSING MODES FOR DETECTING LABEL POSITION, PREPRINTED MARKS ON LABEL LINERS AND PREPRINTED MARKS ON LABELS

(71) Applicant: TransAct Technologies Incorporated, Hamden, CT (US)

(72) Inventors: David Weeks, Willseyville, NY (US); James Del Signore, Trumansburg, NY (US)

(73) Assignee: TransAct Technologies Incorporated, Hamden, CT (US)

(*) Notice: Subject to any disclaimer, the term of this patent is extended or adjusted under 35 U.S.C. 154(b) by 120 days.

(21) Appl. No.: 16/293,994

(22) Filed: Mar. 6, 2019

(65) Prior Publication Data

US 2020/0284619 A1  Sep. 10, 2020

(51) Int. Cl.
*G01D 5/34* (2006.01)
*B41J 11/00* (2006.01)
*B41J 3/407* (2006.01)

(52) U.S. Cl.
CPC ............ *G01D 5/342* (2013.01); *B41J 3/4075* (2013.01); *B41J 11/0095* (2013.01)

(58) Field of Classification Search
CPC .. G01D 5/342; G01D 5/32; G01D 5/34; B41J 11/0095; B41J 3/4075; B41J 11/009; B41J 11/46
See application file for complete search history.

(56) References Cited

U.S. PATENT DOCUMENTS

| | | | |
|---|---|---|---|
| 7,417,656 B1* | 8/2008 | Holzschuh | B41J 11/0095 347/177 |
| 8,950,957 B2 | 2/2015 | Supron et al. | |
| 8,960,064 B2 | 2/2015 | Supron et al. | |
| 2007/0231043 A1 | 10/2007 | Miyashita et al. | |
| 2007/0262141 A1 | 11/2007 | Ito et al. | |
| 2010/0208026 A1* | 8/2010 | Yoshie | B41J 3/4075 347/225 |
| 2013/0044178 A1* | 2/2013 | Tsuchiya | B41J 11/46 347/246 |
| 2016/0238738 A1* | 8/2016 | Lemoi | G01V 8/20 |

* cited by examiner

*Primary Examiner* — Jennifer D Bennett
(74) *Attorney, Agent, or Firm* — Lipsitz & McAllister, LLC

(57) ABSTRACT

A label sensing mechanism for a printer mechanism is provided. The label sensing mechanism may comprise a first optical sensor and a second optical sensor disposed opposite one another, each of the first optical sensor and the second optical sensor may comprise an emitter and a detector. The first optical sensor and the second optical sensor may be positioned on either side of a paper path along which label liner bearing labels to be printed travels. The first optical sensor and the second optical sensor may be operable together or separately in order to detect label position, preprinted marks on the label liner, and preprinted marks on the labels. A method for sensing labels using such a label sensing mechanism and a printer having such a label sensing mechanism are also provided.

9 Claims, 8 Drawing Sheets

LABEL SENSING MECHANISM WITH TWO OPTICAL SENSORS AND DIFFERENT SENSING MODES FOR DETECTING LABEL POSITION, PREPRINTED MARKS ON LABEL LINERS AND PREPRINTED MARKS ON LABELS

BACKGROUND OF THE INVENTION

The present invention relates to the field of label printers. More specifically, the present invention relates to an improved label sensing mechanism, a corresponding label sensing method, and a printer mechanism with such a label sensing mechanism.

Label printers are used in a wide variety of applications, including but not limited to freshness labels for restaurants. A label printer may accept a label roll consisting of a continuous label liner on which labels to be printed are disposed in a spaced apart manner. A sensor is typically used to detect the position of the labels on the label liner in order to ensure that the text to be printed is correctly positioned on the label. For example, gaps between the labels on the label liner may be sensed to determine label position.

Further, certain types of label printers may use a label roll with preprinted marks. The preprinted marks may comprise evenly spaced-apart black dots, lines, or the like. The preprinted marks may denote print areas for the sticky labels, paper type, or location of adhesive for the labels. To accommodate the use of such label rolls, the sensor detects the presence of preprinted marks (e.g., lines or dots) on the paper roll. For example, where the preprinted marks denote a paper type, the sensor may detect the marks and provide a paper type signal to the controller. The controller, in response to the paper type signal indicating the presence of the marks, may at least one of decreases a print speed of the printer mechanism and increases an energy of the printer mechanism to better print on the sticky paper roll. Further, the preprinted marks may denote a print location, the location of the adhesive or the location of the label bearing the adhesive (which e.g., may be positioned between the preprinted marks). The preprinted marks may be provided on the label liner or on the labels themselves.

It would be advantageous to provide a sensing mechanism and method which can be used to accurately sense label position in various types of label rolls as well as sense the presence of preprinted marks on the label or label liner. It would be further advantageous to provide a label sensing mechanism operable in a number of different sensing modes to sense label position and preprinted markings on different types of label rolls.

The methods and apparatus of the present invention provide the foregoing and other advantages.

SUMMARY OF THE INVENTION

The present invention relates to an improved label sensing mechanism, a corresponding label sensing method, and a printer mechanism with such a label sensing mechanism.

In one example embodiment of a label sensing mechanism for a printer mechanism in accordance with the present invention, the label sensing mechanism may comprise a first optical sensor and a second optical sensor disposed opposite one another, each of the first optical sensor and the second optical sensor may comprise an emitter and a detector. The first optical sensor and the second optical sensor may be positioned on either side of a paper path along which label liner bearing labels to be printed travels. The first optical sensor and the second optical sensor may be operable together or separately in order to detect label position, preprinted marks on the label liner, and preprinted marks on the labels.

At least one of the first optical sensor and the second optical sensor may detect the label position by detecting gaps between the labels disposed on the label liner. The gaps may be detected by activating the emitter in the first optical sensor and the detector in the second optical sensor. Alternatively, the gaps may be detected by activating the emitter in the second optical sensor and the detector in the first optical sensor.

The preprinted marks on the label liner may be detected by activating the emitter and detector in the second optical sensor. The preprinted marks on the labels may be detected by activating the emitter and detector in the first optical sensor.

The first optical sensor may be mounted in a movable print head cover of the printer mechanism. The second optical sensor may be mounted in a lower paper guide of the printer mechanism. The first optical sensor and the second optical sensor may be disposed opposite one another in a closed position of the print head cover.

The first optical sensor and the second optical sensor may be operable together in an interruptive mode. Further, the first optical sensor and the second optical sensor may be operable separately in a reflective mode. For example, four sensing modes may be provided, as follows: a first mode for sensing gaps between the labels in which the emitter of the first optical sensor is activated and the detector of the second optical sensor is activated; a second mode for sensing gaps between the labels in which the detector of the first optical sensor is activated and the emitter of the second optical sensor is activated; a third mode for detecting preprinted marks on the label liner in which the detector and emitter of the second optical sensor are activated; and a fourth mode for detecting preprinted marks on the labels in which the detector and emitter of the first optical sensor are activated.

The present invention also encompasses a method for sensing labels in a label printer. An example embodiment of such a method may comprise defining a paper path along which label liner bearing labels to be printed travels; positioning a first optical sensor on a first side of the paper path opposite a second optical sensor positioned on a second side of the paper path, each of the first optical sensor and the second optical sensor comprising an emitter and a detector; and operating the first optical sensor and the second optical sensor together or separately in order to detect label position, preprinted marks on the label liner, and preprinted marks on the labels.

The method may also include additional features discussed above in connection with the various embodiments of the corresponding label sensing mechanism.

The present invention also encompasses a printer mechanism with a label sensing mechanism as described above. In one example embodiment, the printer mechanism may comprise a first optical sensor disposed in a movable print head of the printer mechanism and a second optical sensor disposed in a lower paper guide of the printer mechanism. Each of the first optical sensor and the second optical sensor may comprise an emitter and a detector. The first optical sensor and the second optical sensor may be positioned opposite one another on either side of a paper path along which label liner bearing labels to be printed travels when the print head cover is in a closed position. The first optical sensor and the second optical sensor may be operable together or separately in order to detect label position, preprinted marks on the label liner, and preprinted marks on the labels.

The printer mechanism may also include additional features discussed above in connection with the various embodiments of the corresponding label sensing mechanism.

BRIEF DESCRIPTION OF THE DRAWINGS

The present invention will hereinafter be described in conjunction with the appended drawing figures, wherein like reference numerals denote like elements, and.

DETAILED DESCRIPTION

Figure 1:
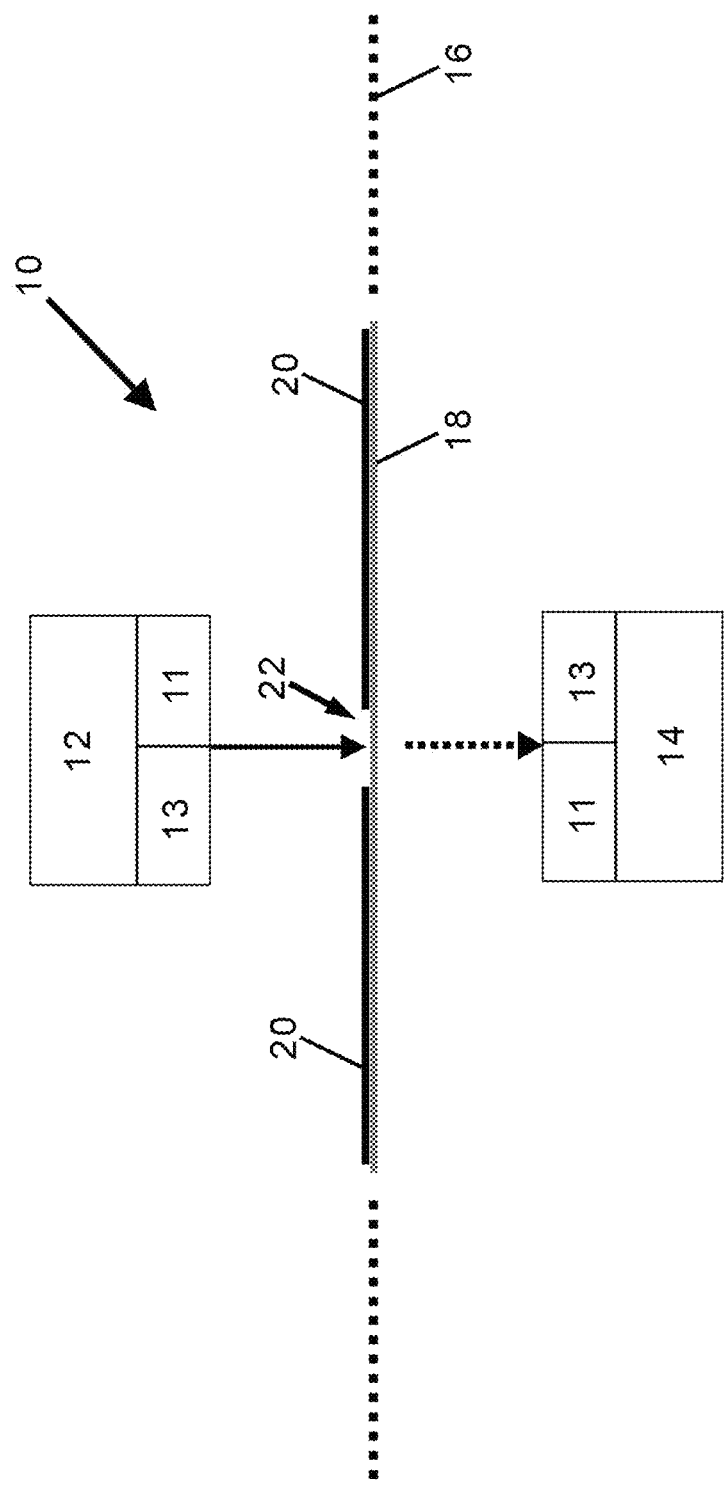
FIG. 1 shows an example embodiment of a label sensing mechanism in accordance with the present invention in a first mode of operation.

The ensuing detailed description provides exemplary embodiments only, and is not intended to limit the scope, applicability, or configuration of the invention. Rather, the ensuing detailed description of the exemplary embodiments will provide those skilled in the art with an enabling description for implementing an embodiment of the invention. It should be understood that various changes may be made in the function and arrangement of elements without departing from the spirit and scope of the invention as set forth in the appended claims.

The present invention relates to an improved label sensing mechanism, a corresponding label sensing method, and a printer mechanism with such a label sensing mechanism.

FIGS. 1-4 show an example embodiment of a label sensing mechanism 10 for a printer mechanism in accordance with the present invention. The label sensing mechanism 10 may comprise a first optical sensor 12 and a second optical sensor 14 disposed opposite one another, each of the first optical sensor 12 and the second optical sensor 14 may comprise an emitter 11 and a detector 13. The first optical sensor 12 and the second optical sensor 14 may be positioned on either side of a paper path 16 along which label liner 18 bearing labels 20 to be printed travels. The first optical sensor 12 and the second optical sensor 14 may be operable together or separately in order to detect label position, preprinted marks on the label liner 18, and preprinted marks on the labels 20.

At least one of the first optical sensor 12 and the second optical sensor 14 may detect the label position by detecting gaps 22 between the labels 20 disposed on the label liner 18. The gaps 22 may be detected by activating the emitter 11 in the first optical sensor 12 and the detector 13 in the second optical sensor 14. Alternatively, the gaps may be detected by activating the emitter 11 in the second optical sensor 14 and the detector 13 in the first optical sensor 12.

Figure 5C:
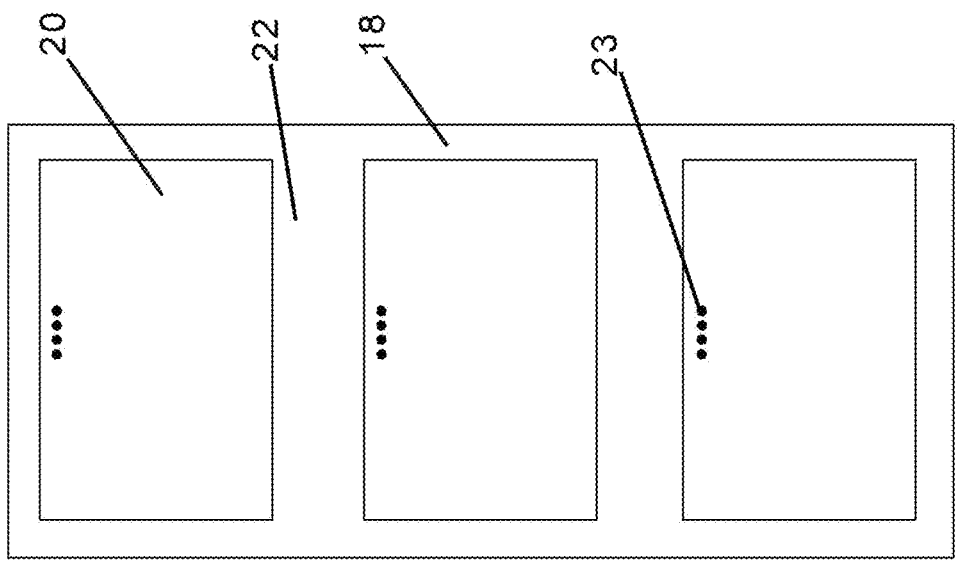
FIGS. 5A, 5B, and 5C show examples of label stock with preprinted marks.
Figure 5B:
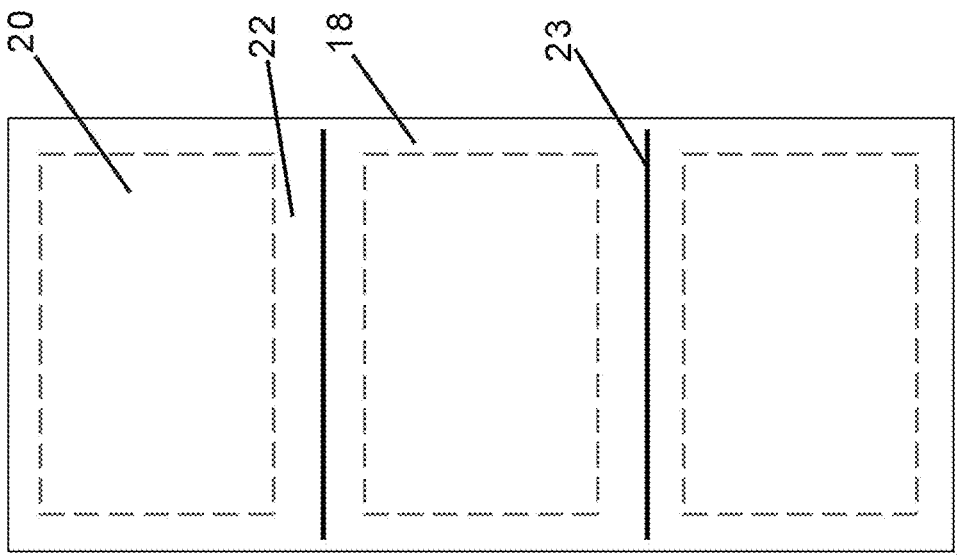
Figure 5A:
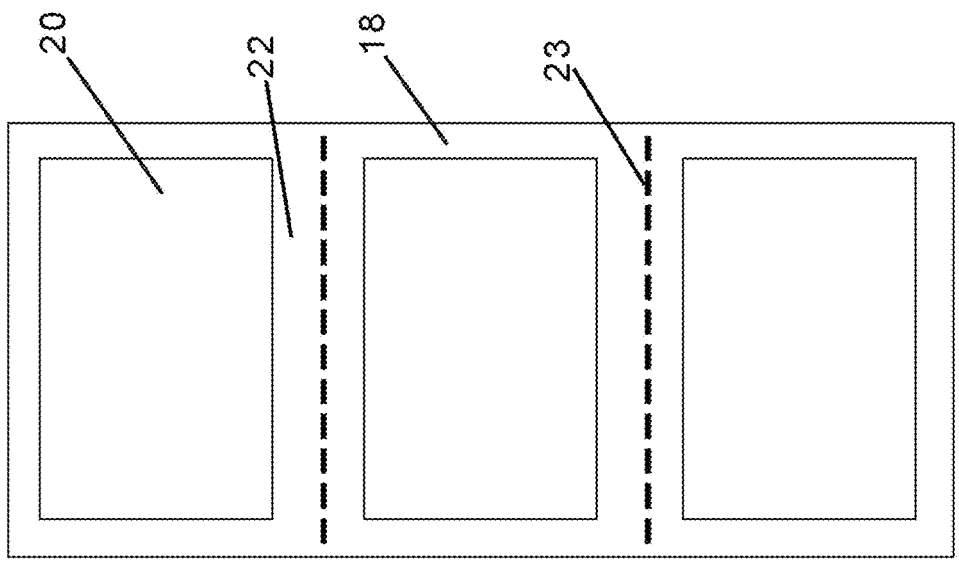

Preprinted marks 23 on the label liner 18 may be detected by activating the emitter 11 and detector 13 in the second optical sensor 14. Preprinted marks 23 on the labels 20 may be detected by activating the emitter 11 and detector 13 in the first optical sensor 12. FIGS. 5A-5C show examples of preprinted marks 23 that may be provided on the labels 20 or label liner 18. For example, FIG. 5A shows the preprinted marks 23 as dashed lines on a top side of the label liner 18 in the gap 22, FIG. 5B shows the preprinted marks 23 as a solid line on a bottom side of the label liner 18 in the gap 22, and FIG. 5C shows the preprinted marks 23 as a series of black dots on the labels 20. Other configurations, arrangements and placements of the preprinted marks 23 are also possible, including but not limited to black dots on the label liner 18, black lines on the labels 20, or other indicia of the label position.

Figure 6:
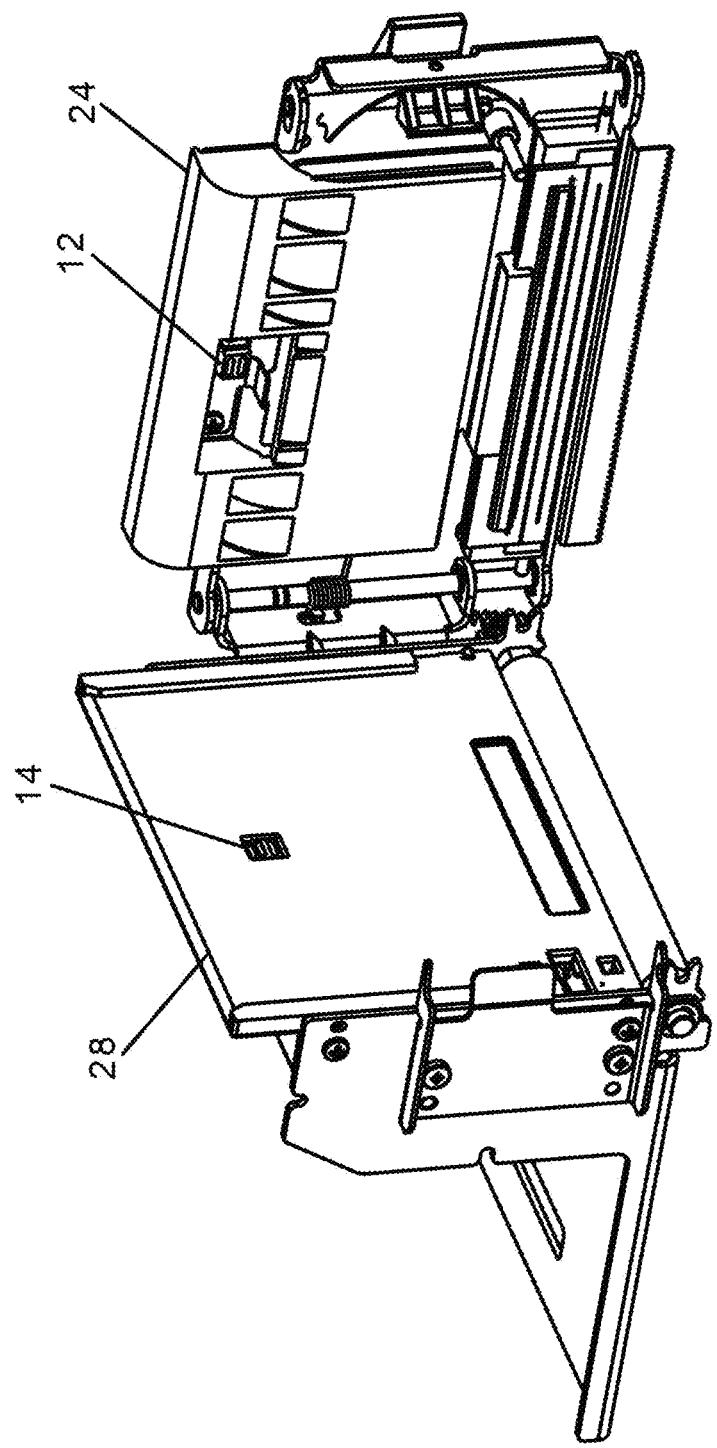
FIG. 6 shows an example embodiment of a label sensing mechanism in accordance with the present invention as mounted in a print head cover assembly and lower paper guide of a printer.
Figure 7:
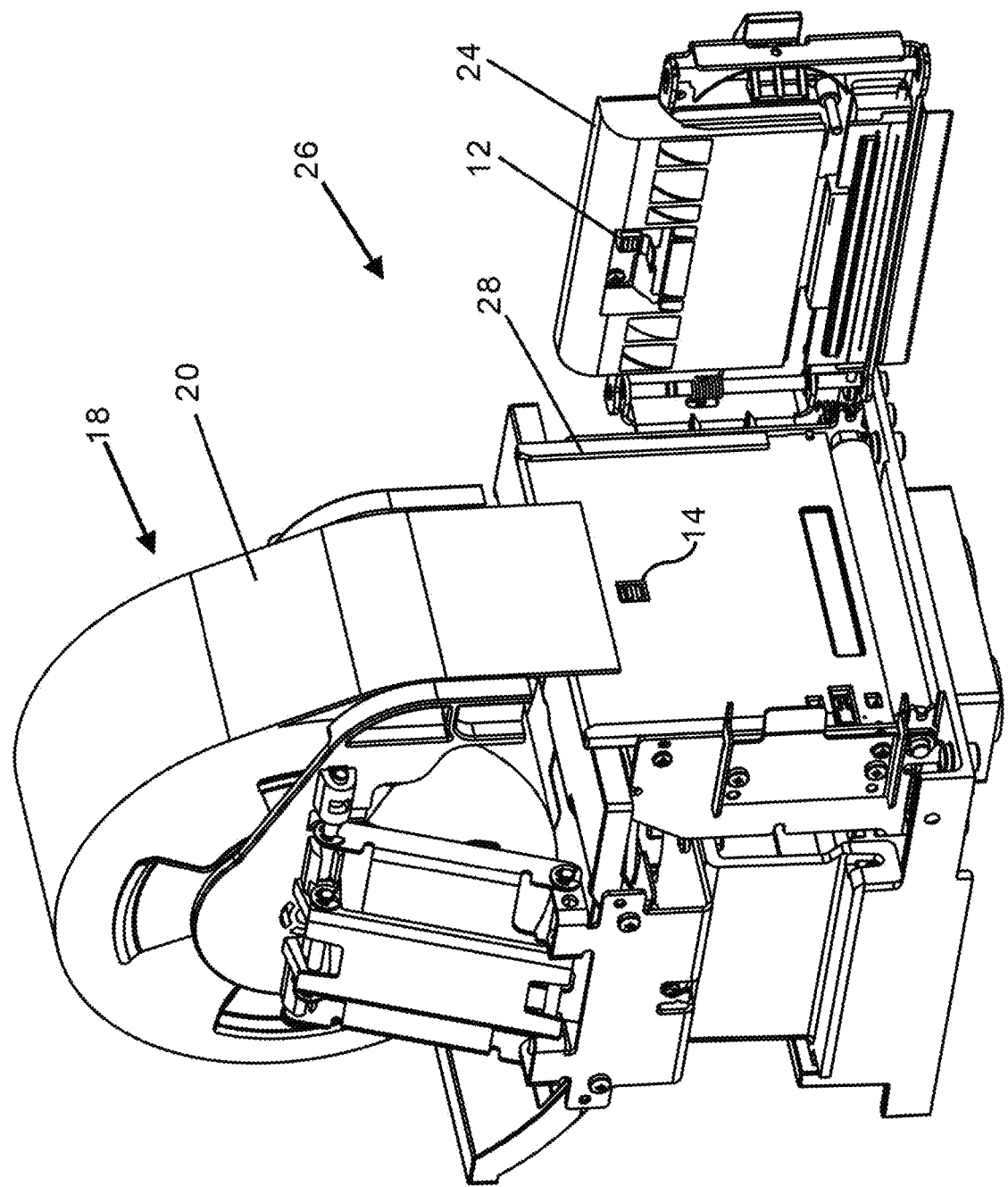
FIG. 7 shows an example embodiment of a printer mechanism in an opened position having a label sensing mechanism in accordance with present invention.
Figure 8:
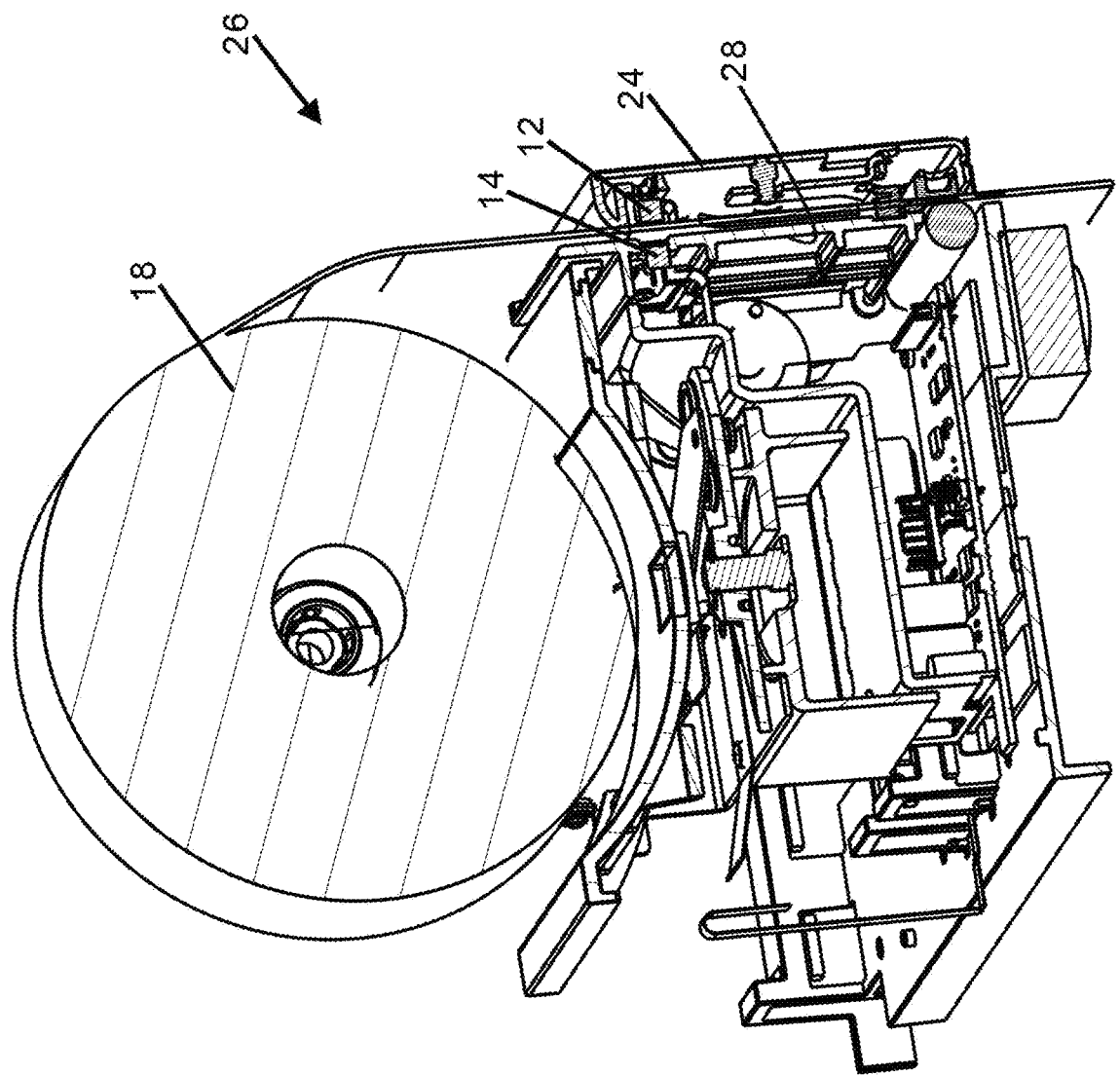
FIG. 8 shows a cutaway view of the printer mechanism of FIG. 7 in a closed position in accordance with present invention.

As shown in FIGS. 6-8, the first optical sensor 12 may be mounted in a movable print head cover 24 of a printer mechanism 26. The second optical sensor 14 may be mounted in a lower paper guide 28 of the printer mechanism 26. The first optical sensor 12 and the second optical sensor 14 may be disposed opposite one another in a closed position of the print head cover 24 (as shown in FIG. 8).

Figure 2:
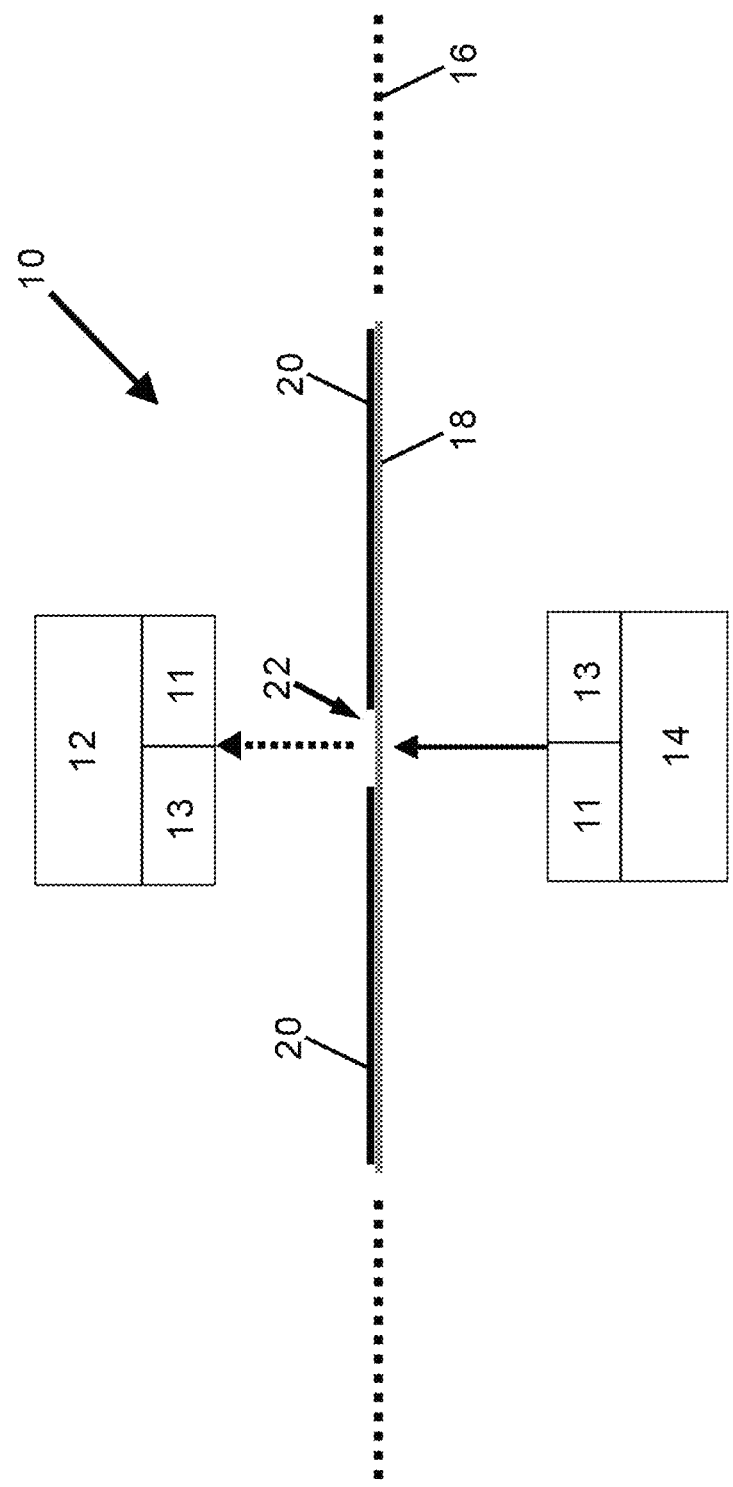
FIG. 2 shows an example embodiment of a label sensing mechanism in accordance with the present invention in a second mode of operation.
Figure 3:
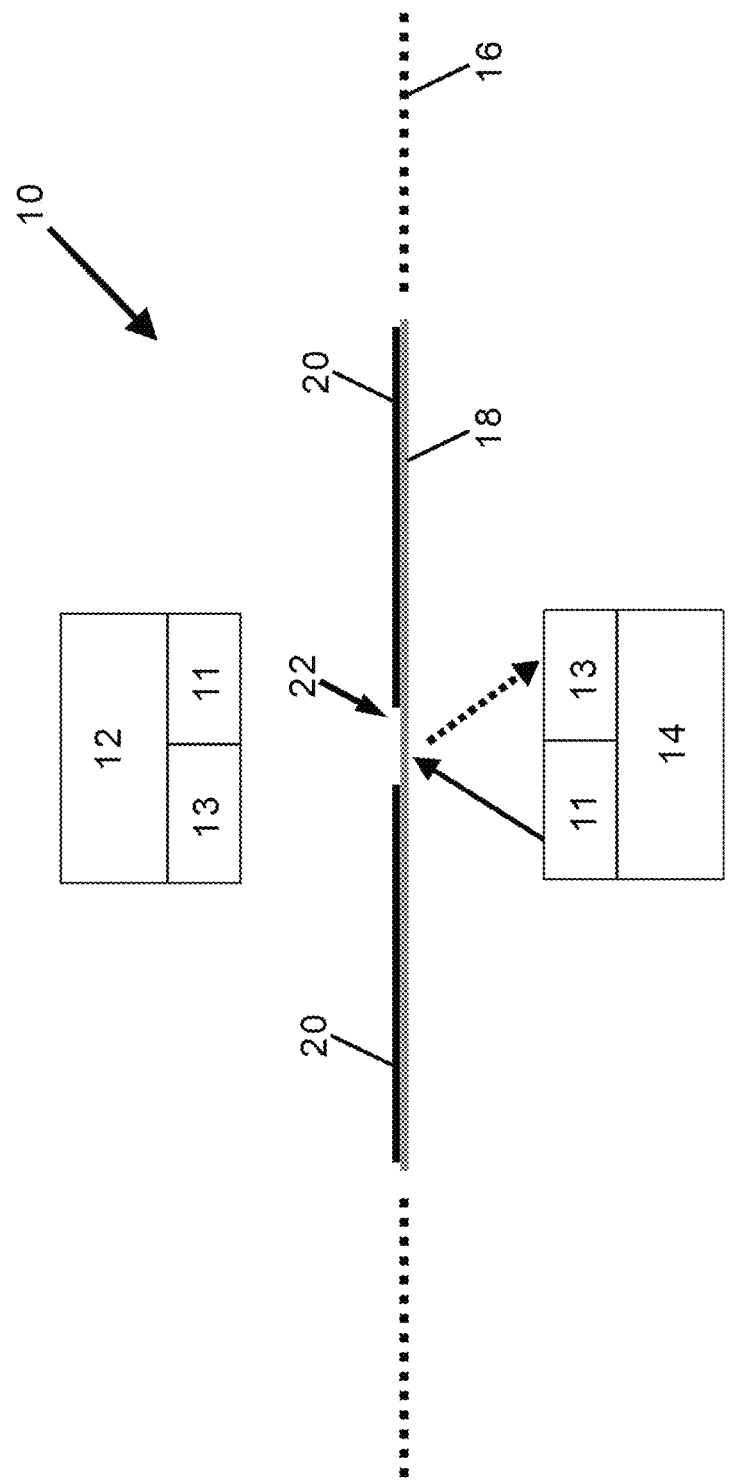
FIG. 3 shows an example embodiment of a label sensing mechanism in accordance with the present invention in a third mode of operation.
Figure 4:
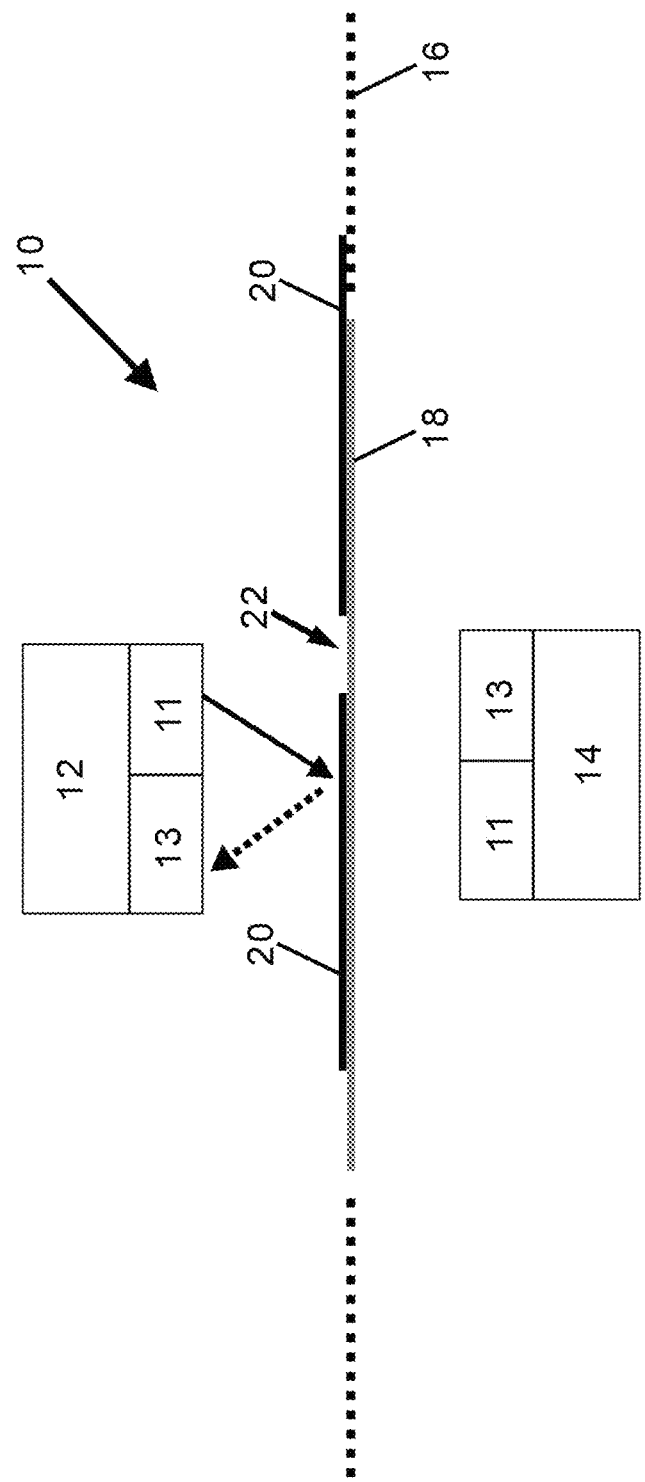
FIG. 4 shows an example embodiment of a label sensing mechanism in accordance with the present invention in a fourth mode of operation.

The first optical sensor 12 and the second optical sensor 14 may be operable together in an interruptive mode (i.e., with the target between the emitter 11 of one sensor and the detector 13 of the other sensor). Further, the first optical sensor 12 and the second optical sensor 14 may be operable separately in a reflective mode (i.e., with the signal from the emitter 11 reflecting off of the target and sensed by the detector 13 of the same sensor). With such an arrangement, four sensing modes may be provided, as follows: a first mode as shown in FIG. 1 for sensing gaps 22 between the labels 20 in which the emitter 11 of the first optical sensor 12 is activated and the detector 13 of the second optical sensor 14 is activated; a second mode as shown in FIG. 2 for sensing gaps 22 between the labels 20 in which the detector 13 of the first optical sensor 12 is activated and the emitter 11 of the second optical sensor 14 is activated; a third mode as shown in FIG. 3 for detecting preprinted marks 23 on the label liner 18 in which the detector 13 and emitter 11 of the second optical sensor 14 are activated; and a fourth mode as shown in FIG. 4 for detecting preprinted marks 23 on the labels 20 in which the detector 13 and emitter 11 of the first optical sensor 12 are activated.

The present invention also encompasses a method for sensing labels 20 in a label printer. An example embodiment of such a method may comprise defining a paper path 16 along which label liner 18 bearing labels 20 to be printed travels; positioning a first optical sensor 12 on a first side of the paper path 16 opposite a second optical sensor 14 positioned on a second side of the paper path 16, each of the first optical sensor 12 and the second optical sensor 14 comprising an emitter 11 and a detector 13; and operating the first optical sensor 12 and the second optical sensor 14 together or separately in order to detect label position, preprinted marks 23 on the label liner 18, and preprinted marks 23 on the labels 20.

The method may also include additional features discussed above in connection with the various embodiments of the corresponding label sensing mechanism 10.

The present invention also encompasses a printer mechanism 26 with a label sensing mechanism 10 as described above. As shown in FIGS. 7 and 8, the printer mechanism 26 may comprise a first optical sensor 12 disposed in a movable print head 24 of the printer mechanism 26 and a second optical sensor 14 disposed in a lower paper guide 28 of the printer mechanism 26. Each of the first optical sensor 12 and the second optical sensor 14 may comprise an emitter 11 and a detector 13. The first optical sensor 12 and the second optical sensor 14 may be positioned opposite one another on either side of a paper path along which label liner bearing labels to be printed travels when the print head cover 24 is in a closed position (as shown in FIG. 8). The first optical sensor 12 and the second optical sensor 14 may be operable together or separately in order to detect label position, preprinted marks 23 on the label liner 18, and preprinted marks 23 on the labels 20.

The printer mechanism 26 may also include additional features discussed above in connection with the various embodiments of the corresponding label sensing mechanism 10.

It should now be appreciated that the present invention provides advantageous methods and apparatus for label sensing, including sensing of label position, preprinted marks on labels and preprinted marks on a label liner.

Although the invention has been described in connection with various illustrated embodiments, numerous modifications and adaptations may be made thereto without departing from the spirit and scope of the invention as set forth in the claims.

What is claimed is:

1. A label sensing mechanism for a printer mechanism, comprising:
    a first optical sensor and a second optical sensor disposed opposite one another, each of the first optical sensor and the second optical sensor comprising an emitter and a detector;
    the first optical sensor and the second optical sensor being positioned on either side of a paper path along which label liner bearing labels to be printed travels;
    wherein:
    the first optical sensor and the second optical sensor are operable together or separately in order to detect label position, preprinted marks on the label liner, and preprinted marks on the labels; and
    four sensing modes are provided, comprising:
        a first mode for sensing gaps between the labels in which the emitter of the first optical sensor is activated and the detector of the second optical sensor is activated;
        a second mode for sensing gaps between the labels in which the detector of the first optical sensor is activated and the emitter of the second optical sensor is activated;
        a third mode for detecting preprinted marks on the label liner in which the detector and emitter of the second optical sensor are activated; and
        a fourth mode for detecting preprinted marks on the labels in which the detector and emitter of the first optical sensor are activated.

2. A label sensing mechanism in accordance with claim 1, wherein at least one of the first optical sensor and the second optical sensor detects the label position by detecting gaps between the labels disposed on the label liner.

3. A label sensing mechanism in accordance with claim 1, wherein:
    the first optical sensor is mounted in a movable print head cover of the printer mechanism and the second optical sensor is mounted in a lower paper guide of the printer mechanism; and
    the first optical sensor and the second optical sensor are disposed opposite one another in a closed position of the print head cover.

4. A label mechanism in accordance with claim 1, wherein:
    the first optical sensor and the second optical sensor are operable together in an interruptive mode; and
    the first optical sensor and the second optical sensor are operable separately in a reflective mode.

5. A method for sensing labels in a label printer, comprising:
    defining a paper path along which label liner bearing labels to be printed travels;
    positioning a first optical sensor on a first side of the paper path opposite a second optical sensor positioned on a second side of the paper path, each of the first optical sensor and the second optical sensor comprising an emitter and a detector;
    operating the first optical sensor and the second optical sensor together or separately in order to detect label position, preprinted marks on the label liner, and preprinted marks on the labels;
    wherein four sensing modes are provided, comprising:
        a first mode for sensing gaps between the labels in which the emitter of the first optical sensor is activated and the detector of the second optical sensor is activated;
        a second mode for sensing gaps between the labels in which the detector of the first optical sensor is activated and the emitter of the second optical sensor is activated;
        a third mode for detecting preprinted marks on the label liner in which the detector and emitter of the second optical sensor are activated; and
        a fourth mode for detecting preprinted marks on the labels in which the detector and emitter of the first optical sensor are activated.

6. A method in accordance with claim 5, wherein at least one of the first optical sensor and the second optical sensor detects the label position by detecting gaps between the labels disposed on the label liner.

7. A method in accordance with claim 5, wherein:
    the first optical sensor is mounted in a movable print head cover of the printer mechanism and the second optical sensor is mounted in a lower paper guide of the printer mechanism; and
    the first optical sensor and the second optical sensor are disposed opposite one another in a closed position of the print head cover.

8. A method in accordance with claim 5, wherein:
    the first optical sensor and the second optical sensor are operable together in an interruptive mode; and
    the first optical sensor and the second optical sensor are operable separately in a reflective mode.

9. A printer mechanism, comprising:
    a first optical sensor disposed in a movable print head of the printer mechanism;
    a second optical sensor disposed in a lower paper guide of the printer mechanism;
    each of the first optical sensor and the second optical sensor comprising an emitter and a detector;

the first optical sensor and the second optical sensor being positioned opposite one another on either side of a paper path along which label liner bearing labels to be printed travels when the print head cover is in a closed position;

the first optical sensor and the second optical sensor are operable together or separately in order to detect label position, preprinted marks on the label liner, and preprinted marks on the labels;

wherein four sensing modes are provided, comprising:
- a first mode for sensing gaps between the labels in which the emitter of the first optical sensor is activated and the detector of the second optical sensor is activated;
- a second mode for sensing gaps between the labels in which the detector of the first optical sensor is activated and the emitter of the second optical sensor is activated;
- a third mode for detecting preprinted marks on the label liner in which the detector and emitter of the second optical sensor are activated; and
- a fourth mode for detecting preprinted marks on the labels in which the detector and emitter of the first optical sensor are activated.

* * * * *